United States Patent
Shukla et al.

(10) Patent No.: US 8,335,193 B2
(45) Date of Patent: Dec. 18, 2012

(54) THRESHOLD-LESS MOBILE-DRIVEN HANDOFF METHOD FOR CELLULAR SYSTEMS USING UNLICENSED SPECTRUM

(75) Inventors: Amit Shukla, San Jose, CA (US); Shashidhar Gandham, San Jose, CA (US); Jinu Kurian, Sunrise, FL (US)

(73) Assignee: XG Technology, Inc., Sarasota, FL (US)

(*) Notice: Subject to any disclaimer, the term of this patent is extended or adjusted under 35 U.S.C. 154(b) by 420 days.

(21) Appl. No.: 12/804,058

(22) Filed: Jul. 13, 2010

(65) Prior Publication Data

US 2011/0013599 A1  Jan. 20, 2011

Related U.S. Application Data

(60) Provisional application No. 61/271,357, filed on Jul. 20, 2009.

(51) Int. Cl.
*H04W 4/00* (2009.01)

(52) U.S. Cl. .................................................. 370/331
(58) Field of Classification Search .................. 370/335, 370/331, 342; 455/436, 562.1, 442, 444
See application file for complete search history.

(56) References Cited

U.S. PATENT DOCUMENTS

| 8,254,935 B2 * | 8/2012 | Tomita et al. .................. 455/442 |
| 2002/0102977 A1 | 8/2002 | Shi |
| 2007/0110015 A1 | 5/2007 | Chakraborty et al. |

* cited by examiner

*Primary Examiner* — Chandrahas Patel
(74) *Attorney, Agent, or Firm* — Dennis L. Cook, ESQ.

(57) ABSTRACT

In wireless networks where multiple base stations are deployed, handsets may handoff from one base station to the other while in a voice call. In this disclosure a layer-2 hand-off mechanism for cellular systems designed to operate in unlicensed spectrum is described. More specifically a proposed method that does not use any pre-determined thresholds to initiate the hand-offs is disclosed.

5 Claims, 4 Drawing Sheets

| Results in Figure | Active Channel | PCL Channel | Non-PCL Channel |
|---|---|---|---|
| Figure 2 | 0.05 | 0.2 | 0.5 |
| Figure 3 | 0.05 | 0.1 | 0.5 |
| Figure 4 | 0.05 | 0.2 | 0.7 |
| Figure 5 | 0.02 | 0.2 | 0.7 |
| Figure 6 | 0.01 | 0.2 | 0.7 |
| Figure 7 | 0.2 (hybrid average) | 0.2 | 0.7 |

Range of α Values Used in Simulation Study

| Results in Figure | Active Channel | PCL Channel | Non-PCL Channel |
|---|---|---|---|
| Figure 2 | 0.05 | 0.2 | 0.5 |
| Figure 3 | 0.05 | 0.1 | 0.5 |
| Figure 4 | 0.05 | 0.2 | 0.7 |
| Figure 5 | 0.02 | 0.2 | 0.7 |
| Figure 6 | 0.01 | 0.2 | 0.7 |
| Figure 7 | 0.2 (hybrid average) | 0.2 | 0.7 |

Range of α Values Used in Simulation Study

Figure 2: Active Channel α = 0.05, PCL α = 0.2, non-PCL α = 0.5

Figure 3: Active Channel α = 0.05, PCL α = 0.1, non-PCL α = 0.5

Figure 4: Active Channel α = 0.05, PCL α = 0.2, non-PCL α = 0.7

Figure 5: Active Channel α = 0.02, PCL α = 0.2, non-PCL α = 0.7

Figure 6: Active Channel α = 0.01, PCL α = 0.2, non-PCL α = 0.7

Figure 7: Active Channel α = 0.2 with simple averaging, PCL α = 0.2, non-PCL α = 0.7

THRESHOLD-LESS MOBILE-DRIVEN HANDOFF METHOD FOR CELLULAR SYSTEMS USING UNLICENSED SPECTRUM

CROSS-REFERENCE TO RELATED APPLICATION

The present application claims the benefit of previously filed Provisional Patent Application, Ser. No. 61/271,357.

FIELD OF THE INVENTION

This invention addresses the need to transport high bit-rate data and voice to multiple users over wired and wireless means. In wireless networks where multiple base stations are deployed, handsets may handoff from one base station to the other while in a voice call. In this disclosure a layer-2 hand-off mechanism for cellular systems designed to operate in unlicensed spectrum is described. More specifically a proposed method that does not use any pre-determined thresholds to initiate the hand-offs is disclosed.

BACKGROUND OF THE INVENTION

The invention disclosed in this application uses any type modulation and more particularly works with a method of modulation now known by its commercial designation, xMax. This new wireless physical layer technology developed by xG Technology Inc., referred to as xMAX, enables extremely low power omni-directional transmissions to be received in a wide area. Using xMAX, significant bandwidth can be made available for supporting various wireless applications. Voice Over IP (VoIP) based cellular services are now being developed using xMAX. In xMAX-based cellular networks both the base station and the handsets will be equipped with an xMAX transceiver. A mobile device (xMAX handset) in such a network will be free to move in an area covered by multiple xMAX base stations. Although this layer-2 hand-off mechanism for cellular systems designed to operate in unlicensed spectrum that does not use any pre-determined thresholds to initiate the hand-offs is disclosed in the preferred embodiment as being used in these types of integer cycle and pulse modulation systems it can be implemented on any broad band wireless technologies like WiMax, WiBro, WiFi, 3GPP and HSDPA, or any other type of wired or wireless voice or data systems.

A heterogeneous MAC protocol proposed to support VoIP traffic in xMAX wireless networks has been discussed in previously filed patent applications U.S. Ser. Nos.: 12/069,057; 12/070,815; 12/380,698; 12/384,546; 12/386,648; 12,387,811; 12/387,807, 12/456,758, 12/456,725, 12/460,497, 12/583,627, 12/583,644, 12/590,472, 12/590,469, 12/590,931, 12/653,021, 12/653,007 and 12/657,324 which are incorporated by reference into this disclosure. In the heterogeneous MAC protocol described in these applications, guaranteed timeslots are assigned to forward VOIP packets, temporary timeslots are assigned to forward data packets and contention based access is used to exchange control messages. Note that this heterogeneous MAC protocol is used here as a reference protocol and similarly xMAX as a reference wireless network. The idea of a system and method for a layer-2 hand-off mechanism for cellular systems designed to operate in unlicensed spectrum that does not use any pre-determined thresholds to initiate the hand-offs as described herein can be used in other relevant systems.

BRIEF SUMMARY OF THE INVENTION

The invention disclosed in this application was developed for and is described in the preferred embodiment as being used in any integer cycle or impulse type modulation and more particularly a method of modulation known by its commercial designation, xMAX, but can be implemented on WiFi, 3GPP, HSDPA or any other type of wired or wireless voice or data systems.

In traditional cellular networks handoff decisions are triggered by well-established thresholds of RSSI. Whenever the RSSI on the current channel drops below pre-determined thresholds mobile nodes are instructed by base transceiver stations to switch to a target channel. Algorithms based on RSSI thresholds are known to perform well when used by systems operating in a licensed part of the spectrum. However, when applied to unlicensed spectrum access systems they might not provide expected performance. Note that in unlicensed bands devices that are not part of the system introduce interference. In addition, the impact of an interferer might not be symmetric at the base station and the mobile device. This invention disclosure describes the design and implementation of a handoff algorithm to be used by cellular systems operating in an unlicensed part of the spectrum. The scope of this invention is limited to layer-2 handoffs. Issues at higher layers are not part of the scope of this invention.

For a fuller understanding of the nature and objects of the invention, reference should be made to the following detailed description taken in connection with the accompanying drawings.

DESCRIPTION OF THE DRAWINGS

For a fuller understanding of the nature and objects of the invention, reference should be made to the accompanying drawings, in which.

DETAILED DESCRIPTION OF THE INVENTION

Figures 1, 2:
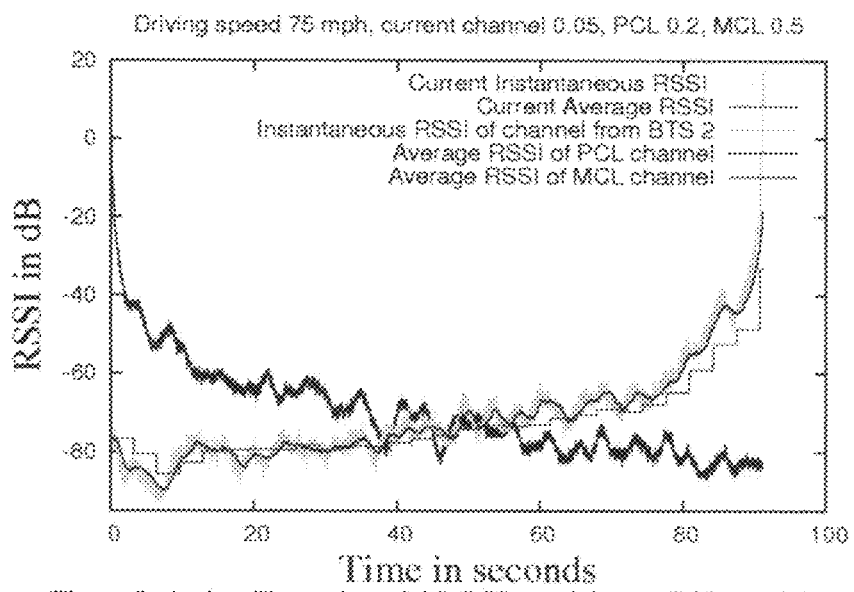
FIG. 1 is a table showing a range of a values.
FIG. 2 is an example an active channel.
Figure 3:
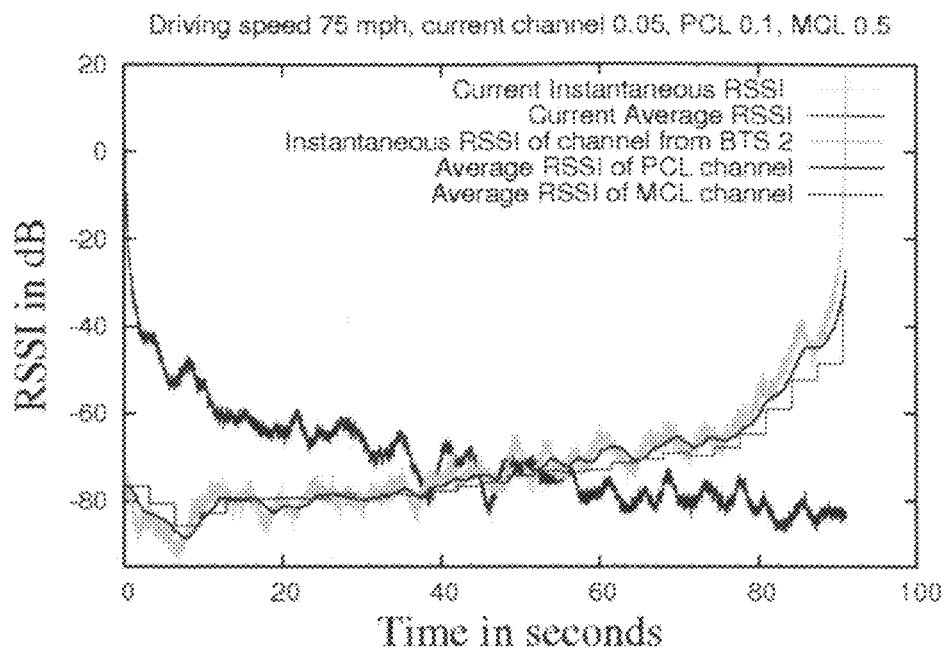
FIG. 3 is an example an active channel.
Figure 4:
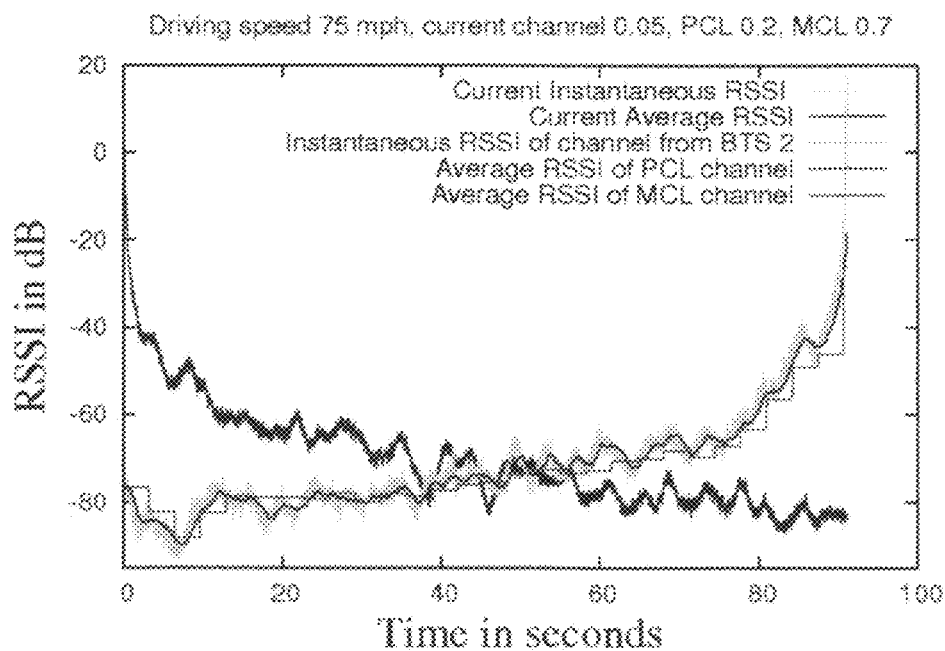
FIG. 4 is an example an active channel.
Figure 5:
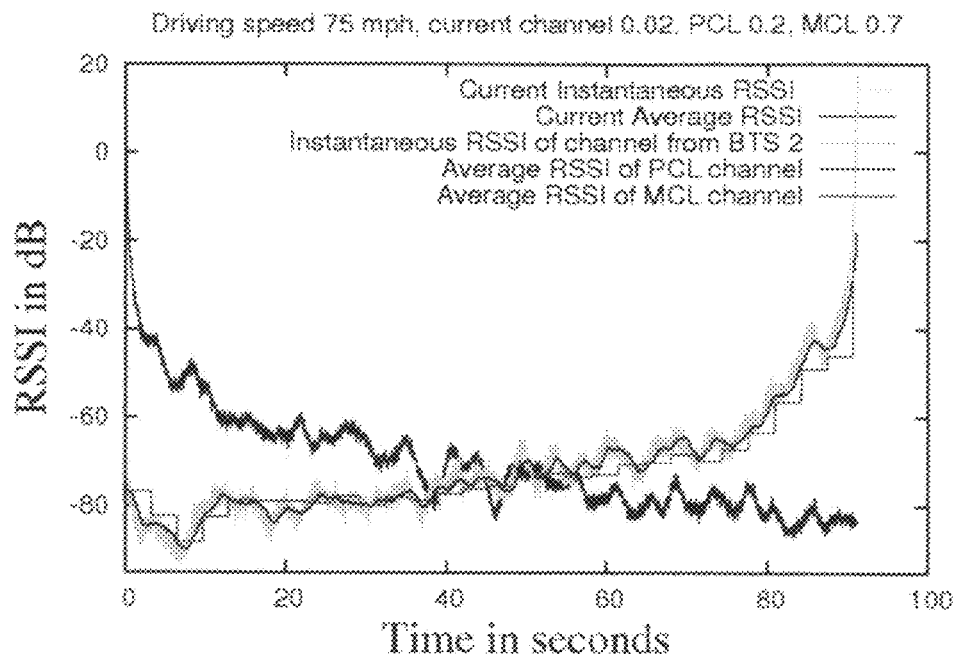
FIG. 5 is an example an active channel.
Figure 6:
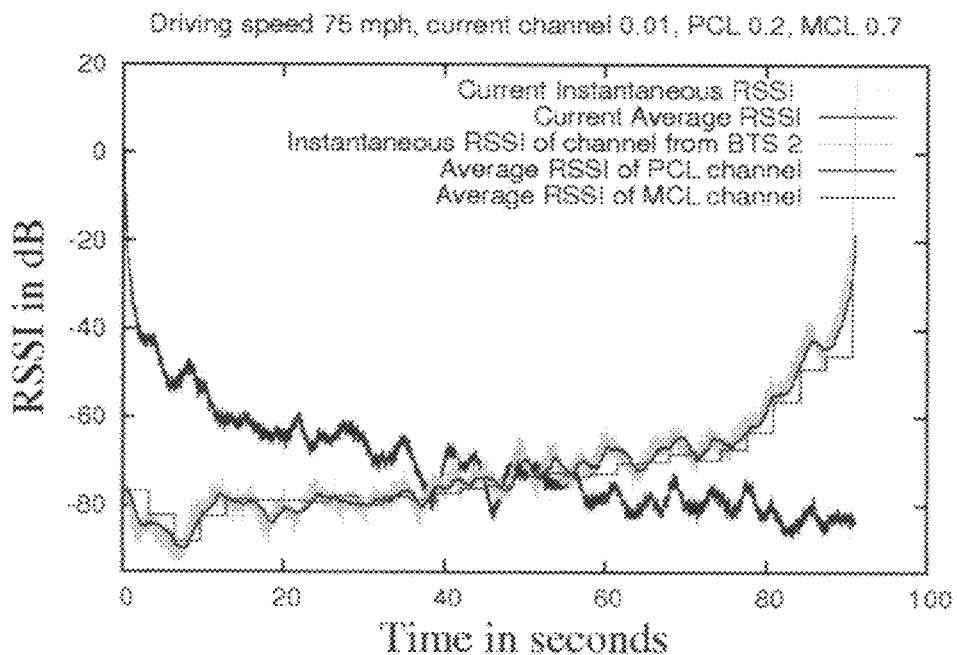
FIG. 6 is an example an active channel; and,
FIG. 7 is an example an active channel.

In a multi-base station deployment a handset might move from one base station to another. To provide seamless coverage one needs a mechanism to enable hand over of mobile devices from the current channel to a new channel. In this disclosure we refer to the new channel as the target channel. Note that the target channel might be operational on a new base station (BTS) or the current BTS. When the target channel is operational on the current BTS the target channel might be on the same sector or on a different sector. Based on where the target channel is assigned, the handoff signaling between the mobile devices and the BTS will vary.

In general, the handoff process will be initiated whenever the quality of the current channel degrades. The link quality of a wireless channel can be measured by various metrics like RSSI, BER, PER, FER, SNR and SiNR. The metrics PER and FER are used interchangeably throughout this document. The link quality on the current channel might reduce due to (i) long-term fading which is result of increasing distance between the BTS and the mobile devices, (ii) short-term or Rayleigh fading and (iii) interference. To avoid initiation of handoff due to ephemeral changes on the channel, one needs to design a good mechanism of calculating weighted average of the channel metrics. Handoff decisions will be based on the weighted average measurements. Note that in unlicensed spectrum access systems handoff provides a mechanism of interference avoidance. Whenever the interference on the current channel impacts the session quality mobile devices will handoff to a different channel that has comparatively less interference.

To mitigate the disruption of voice or data sessions a soft-handoff algorithm is required. The time it takes to identify a target channel is critical for supporting soft-handoffs. To minimize this time the mobile devices need to continuously monitor their current channel and also prospective channels. In addition, they need to decide at the right moment to handoff to a new channel. If the decision is made too soon one might induce a ping-pong effect wherein a mobile does a handoff between two channels back and forth. Ping-pong results in unnecessary signaling traffic over contention or random access channels. If the handoff decision is made too late a user might notice degradation in the voice/data quality.

To monitor a channel, mobile devices have the option of tracking various metrics like RSSI, BER, PER, SNR and SiNR. Whenever a mobile device attempts to receive a MAC layer frame the PHY reports the measured RSSI and the estimated SiNR. For measuring BER one needs to know the content of the transmitted frame a priori. PER can be measured by keeping track of the number of frames for which CRC matched and the total number frames that one received over a window of time.

RSSI indicates the strength of the signal as perceived by the RF circuitry. In a system with dedicated channels it might be a good indicator of the quality of the channel. However in xMAX networks the spectrum is shared with non-xMAX systems. A high RSSI might be due to a strong interfering signal. Because RSSI estimators cannot distinguish an interfering signal RSSI is not a reliable metric.

BER estimation requires transmission of a frame with known content. As a result BER is not a practical metric to be used. PER is a good indicator of the throughput of the channel. However, the goal of handoff algorithms is to select a new channel before degradation of PER on the current channel. As a result one should not use these metrics in tracking the quality of a channel.

Thus SiNR is used as the primary metric for tracking the quality of a channel. One can also keep track of RSSI and PER estimates. Those metrics can be used if multiple prospective channels have SiNR estimates in close proximity. SiNR is a composite metric that accounts for both interference and noise in the channel. As per xMAX MAC-PHY architecture, PHY reports a SiNR estimate as a 16-bit field in the MAC-PHY header. The SiNR estimate provided by the PHY is in the range 0 to 18 and is expressed in dB. For example, an estimate of 18 implies that the signal level is at least 18 dB above the noise floor. Any value above 18 is normalized to this range by artificially raising the noise floor to avoid receiver saturation. The SiNR estimate over a period of time provides a clear indication of the usability of the channel. It is therefore a reliable metric to be used in the handoff decision-making process.

To support a soft handoff mechanism one needs to minimize the time it takes to perform a handoff. Scanning potential channels to select a target channel is a crucial step in the handoff mechanism. Scanning a channel involves receiving a frame to obtain an estimate of the SiNR. During active channel normal communication one receives frames in almost every super-frame and that will provide one with the SiNR estimates. For a prospective channel one needs to schedule the PHY to receive the beacon on that particular channel to obtain a SiNR estimate. Next are presented two alternatives for scanning: (i) Reactive and (ii) Proactive. The logic behind selecting proactive scanning is also explained.

In the reactive scanning method a mobile scans potential channels after concluding that there is a need to perform a handoff. However, in such an implementation the time taken for scanning will significantly increase the latency of a handoff. As one cannot use a single SiNR estimate for handoff decisions, one needs to scan a potential channel several times before selecting the target channel. Moreover one can scan at most one channel in every super-frame. As a result, reactive scanning is a latency intensive task and is not suitable to support soft handoffs.

To eliminate the latency of scanning channels in a handoff scenario proactive scanning is proposed. The list of available channels in the system is referred to as the Member Channel List (MCL). In a naïve implementation of proactive scanning one scans all the channels in MCL once in every epoch. An epoch represents an equal duration of time. For example, in xMAX systems an epoch can be a hyper-frame which lasts for 540 milli seconds. Due to frequency planning at the deployment phase of the network not all channels are available in all the locations. As a result a mobile device might notice only a subset of the MCL in its current location. Hence, scanning all the channels is unnecessary. It might be beneficial to scan a subset of the MCL at a higher rate.

In the preferred embodiment at every mobile there is maintained a Preferred Channel List (PCL). Among all the channels that the mobile noticed in the recent past, those channels with the best running average of SiNR are included in the PCL. The size of the PCL is limited to at most 6 channels. Each channel in the PCL will be scanned 3 times in an epoch. The membership of the PCL is updated once in every 6 epochs. To update the membership the mobile will scan all the MCL channels once in every 6 epochs and update the weighted average of SiNR. The best 6 channels after the update will form the PCL until the next update. Mobile devices do not perform proactive scanning when they are not involved in an active session. Whenever a data or voice session is initiated they perform initial scanning. Initial scanning involves 10 scans of all the MCL channels.

It is known that the instantaneous SiNR measurements can fluctuate as much as 30 dBm due to short-term fading characterized by the Raleigh fading model. Handoff decisions based on instantaneous measurements of SiNR might result in unnecessary handoffs. Hence, one needs an averaging mechanism that will mask-out short term fluctuations and follow the general trend of the link quality.

In the preferred embodiment an averaging factor is defined, say $\alpha$ where $0 < \alpha \leq 1$, to maintain a running average of SiNR. One can then use the equation below to calculate the weighted running average:

$$SiNR_{Avg} = \alpha * SiNR_{current} + (1-\alpha) * SiNR_{Avg}$$

In the above equation, $SiNR_{Avg}$ represents the running average of SiNR, and $SiNR_{Current}$ represents the current estimation of SiNR. Two different values of $\alpha$ are used:
  0.2—for the current channel and channels in the PCL
  0.5—for channels in the MCL As discussed above a bears an inverse relationship with the rate at which a channel is scanned. Hence, for PCL channels that are scanned at a faster rate, a lower value of $\alpha$ is selected. Accordingly for MCL a higher value is selected. Note that the current channel is scanned at least once in every super-frame. However, in the above equation we use the same $\alpha$ as in the PCL. To equalize the scan rate of the current channel to PCL channels we perform a simple average on every six SiNR estimates. The resulting SiNR value is used to update the weighted average once in every six super-frames. This approach is referred to as the hybrid-averaging approach.

As stated above one needs to maintain a running average of SiNR such that one does not follow intermittent fades. The objective is to track the overall trend of the channel conditions and handoff to a better channel. The following equation was selected in the preferred embodiment to maintain the running average:

$$SiNR_{Avg} = \alpha * SiNR_{current} + (1-\alpha) * SiNR_{Avg}$$

In the above equation, $SiNR_{Avg}$ represents the running average of SiNR, and $SINR_{Current}$ represents the current estimation of SiNR. The value of α selected represents the amount of weight-age one would like to give the most recent readings. Note that $0 < \alpha \leq 1$. A high value of α indicates that weighted average will closely reflect the instantaneous reading. On the other hand a very low value of a might result in a delayed handoff. To select the appropriate value for a elaborate simulations were run.

The simulator developed is event-driven. The setup consists of two adjacent towers and a handset that starts at the first tower and moves towards the second tower. The speed of the handset is set to 75 MPH. From the design of xMAC we know that a handset will receive a beacon from the base stations once in every super-frame. Hence, the event resolutions were set to super-frame duration; once every 30 milliseconds the handset can scan a channel and obtain a SiNR estimate. The handset's current channel is on the first tower. There was also simulated a PCL and a non-PCL channel on the second tower. To determine the SiNR estimate at any given instance the Hata model for path loss in sub-urban areas was used in combination with a correlated Guassian additive with a standard deviation of 8 dB to simulate the shadowing effect.

Below is a representative set of simulations that were conducted. The Table in FIG. 1 shows the values of a used in the simulation results reported.

In these experiments different values of a were used for an active channel, a PCL channel, and an MCL channel that is not part of the PCL. This decision is based on the observation that the rate at which one scans a channel depends on the channel type. For example, a PCL channel is scanned more often than a non-PCL channel. If one uses the same value of a for both the channels then one will be giving more weight to a recent reading for a PCL channel than a non-PCL channel. Hence, a lower α value for a PCL channel is used.

In FIGS. 2 to 7 the reader will notice how instantaneous SiNR and weighted average SiNR vary for all three types of channels. For the current channel the SiNR value decreases overall as the mobile moves away from the first tower. However, it can be noticed that in some instances SiNR increases with distance. For example, in FIG. 2 after 40 seconds of simulation time the SiNR on the active channel increases even though the mobile is moving away from the tower. The observation can be attributed to the characteristics of a fading channel. For a PCL and a non-PCL channel supported by the second tower the SiNR value increases as the mobile moves closer to the second tower. Similar to the active channel there are instances in which the SiNR decreases in decreases in distance. As stated earlier, the goal of the weighted average algorithm is to avoid hand-off decisions based on theses instantaneous fluctuations.

Figure 7:
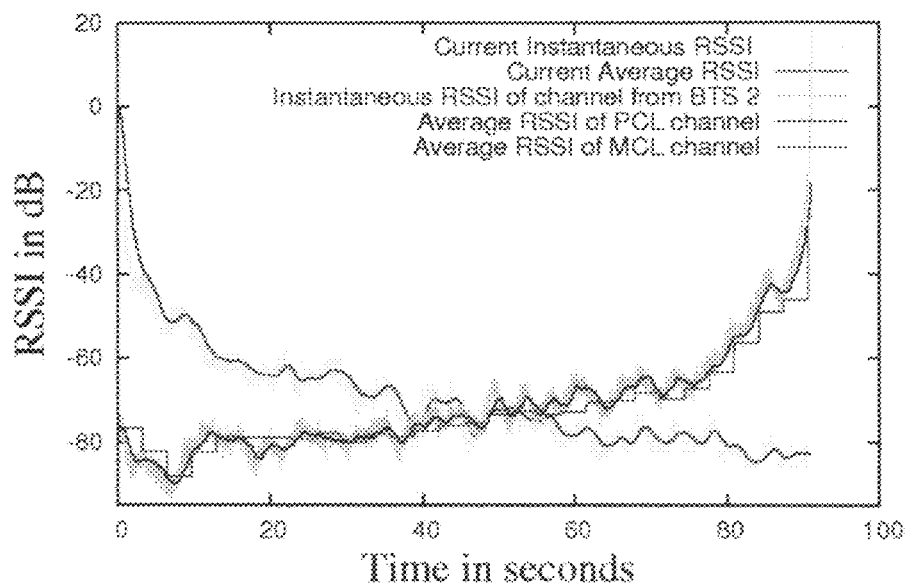

From FIGS. 2 to 6 the reader can also notice that irrespective of the value of a used the weighted average follows instantaneous SiNR readings. This observation can be explained by the fact that the handsets obtains SiNR readings on the active channel more frequently; once every super-frame. To mask out these instantaneous variations a hybrid averaging mechanism is proposed. In this approach a simple average of SiNR measurements is taken. The resulting simple average is used in the weighted average function. The weighted average is updated once in every six super-frames. A value of 0.2 is selected. In FIG. 7 the reader can observe the effect of the hybrid weighted average mechanism. The weighted average does not follow instantaneous fluctuations in SiNR estimates.

From FIGS. 2 to FIG. 7 the reader can notice that for a PCL channel the choice of 0.1 or 0.2 for α masks out the instantaneous fluctuations in SiNR estimates. As per the simulation results both values are good candidates to be used. However, to facilitate handover to a better channel relatively quickly a value 0.2 is chosen.

As non-PCL channels are scanned once in every hyper-frame (530 ms) a relatively high value of α is chosen. Hence, values of 0.5 and 0.7 were tested. The weighted average follows a step function for both the values. In addition both the step functions are almost identical. Note that a non-PCL channel has to first become a PCL channel before it can be a target channel for handoff. Hence, the value of a for a non-PCL channel should not have a significant impact on the performance of the handoff. Though both values yield the same results, a value of 0.5 is suggested in the preferred embodiment.

Based on the analysis of the simulation results one can conclude the following:
  For an active channel the use of a hybrid average function, wherein a simple average of every six SiNR estimates is used in the weighted average equation, is preferred. The value of 0.2 will be used in the equation for α.
  For channels in the PCL use of the weighted average equation with a value of 0.2 for α is preferred.
  For channels not in the PCL use of the weighted average equation with a value of 0.5 for α is preferred.

Whenever the mobile device concludes that it needs to handoff to a new channel, it uses the following selection criteria to decide the target channel. A target channel should meet all the following specified criteria:

Better SiNR. A channel is considered better than the active channel only if the SiNR on that channel is at least a constant dB more than the current channel.

Uplink Interference. It is known that the interference in the unlicensed part of the spectrum can be localized in nature. The Base station might see high interference in the uplink when the handset is not impacted in the downlink on the same channel. As a result, a PCL channel with better downlink SiNR might not be a better channel because of uplink interference. Hence, before choosing a PCL channel as the target channel, one needs to check the uplink interference reported in the beacon. If the channel has high uplink interference then the handset should continue to stay on the current channel.

Residual Capacity. Even if both uplink and downlink are good the channel might not have any residual capacity. If the mobile device sends a handoff request to the corresponding base station there will be a failure response sent. Hence, there is a need to monitor the residual capacity indication bits in the beacon to know if the request for a handoff will be successful. If the base station indicates that there is no residual capacity then the device should continue its session in the current channel.

As explained earlier in this disclosure the decision on when to perform a handoff is crucial. Delay in deciding to perform a handoff will impact the ability to support seamless mobility. On the other hand, a handoff initiated too early will result in unnecessary signaling traffic in the random access channel. A trigger mechanism to initiate handoffs is described below. In the disclosed approach a handset tries to always be on the best available channel. While striving to accomplish this goal the handset will not initiate the handoff process if the current channel is reasonably good.

The proposed handoff initiation trigger mechanism does not use any thresholds of SiNR. Note that threshold based triggers might be complex to implement as the thresholds to be used might vary based on coverage and cell range. In the disclosed approach handoffs are initiated if and when any of the PCL channels meet all the selection criteria listed above. The corresponding channel in the PCL is selected as the target channel.

Note that by following this simple rule a handset might initiate handoff even if the current channel is good. For example, consider a scenario wherein the SiNR on the current channel is 13 dB and SiNR on one of the PCL channels is 16 dB. At 13 dB SiNR we have negligible PER. Moving to a 16 dB channel will not improve the PER to a noticeable extent. Hence, handoff in such situations in not required. To avoid such unwarranted handoffs a check that if the weighted average SiNR of the current channel is 10 dB or more is added. If so then the handset continues on the current channel.

When a mobile device is located on the cell boundary within an overlap zone between two cells, the SiNR of the current channel and the channels in the PCL will fluctuate significantly. Initiating a handoff as soon as a channel in the PCL meets all the criteria might result in a situation where the mobile devices handoff back and forth between the same set of channels. To avoid such ping-pong handoffs a hysteresis timer before initiating a handoff is disclosed. The potential target channel should continue to meet the criteria for a hysteresis time duration. If it fails to meet any of the criteria then the timer is cancelled. When the timer fires the mobile device will initiate handoff signaling. The use of a hysteresis time duration of 1 epoch or hyper-frame for xMAX systems (540 ms) is used in the preferred embodiment. Note that multiple PCL channels might have better weighted SiNR than the current channel. One starts a separate timer for each of these channels. If any of the channels fail the qualification criteria then the corresponding timer is cancelled. The handoff process on the channel whose timer expires first is initiated. Once handoff is complete, all hysteresis timers are reset to avoid frequent handoffs.

Once the hysteresis timer expires, a request for a voice channel is sent to the Base Station using contention access on the target channel. The Base Station announces the voice slot assignment in the paging portion of the target channel in the next super-frame. If for some reason the assignment is not received, the handset follows a linear backoff mechanism to resend the handoff message. In the preferred embodiment it makes four attempts to request a timeslot on the target channel. If all four attempts fail then the mobile device will try to handoff to a channel whose hysteresis timer expires next.

Note that there could be multiple channels whose hysteresis timers could have expired. All the channels whose hysteresis timer expires can be target channels; i.e., there can be multiple target channels concurrently. For example, consider a scenario wherein there are two channels whose timers have expired. These channels are referred to as $C_1$ and $C_2$. Let the timer on $C_1$ expire before $C_2$. The mobile device initiates handoff signaling on $C_1$. Before the handoff of $C_1$ was successful, say because of the need to retransmit the hand-off message, the timer on $C_2$ expires. As per the above proposal the mobile device will initiate handoff process on $C_2$ only when the maximum retry limit on $C_1$ is reached. However, the latency involved in the process might be high. Especially in scenario where the handoff attempt on $C_1$ fails. Alternatively, the mobile device can concurrently start the handoff process on $C_2$. As soon as the timer expires on $C_2$ it can send a CBA message on $C_2$ requesting voice timeslots.

In this invention disclosure a layer-2 hand-off mechanism for cellular systems designed to operate in unlicensed spectrum is disclosed. Unlike traditional systems interference is a factor in these systems and can be asymmetric at the base station and the mobile nodes. The proposed mechanism does not use any pre-determined thresholds to initiate the handoffs and it ensures that the mobile device is using the best available channel without inducing a ping-pong effect.

Since certain changes may be made in the above described system and method for a layer-2 hand-off method that does not use any pre-determined thresholds for cellular systems designed to operate in unlicensed spectrum in mobile networks without departing from the scope of the invention herein involved, it is intended that all matter contained in the description thereof or shown in the accompanying figures shall be interpreted as illustrative and not in a limiting sense.

What is claimed is:

1. A threshold-less method for mobile node handset handoff between channels of multiple base stations having a medium access control protocol used for forwarding Internet Protocol packets between multiple base stations and mobile nodes in voice over the Internet protocol systems on a wireless network comprising:
    multiple base stations in electrical communication with the Internet;
    said multiple base stations having channels;
    one or more mobile nodes in wireless electrical communication with one of said multiple base stations over said channels;
    said multiple base stations and said one or more mobile nodes each having a medium access control protocol;
    each of said multiple base stations transmitting a beacon signal;
    said beacon signal containing information regarding current Signal to Interference-plus-Noise Ratio, uplink interference, and channel capacity for each of said channels;
    said one or more mobile nodes scanning said beacon signal and storing said information regarding current Signal to Interference-plus-Noise Ratio for each of said channels;
    said one or more mobile nodes averaging said Signal to Interference-plus-Noise Ratio from multiple scans to determine an average Signal to Interference-plus-Noise Ratio;
    each of said one or more mobile nodes storing said average Signal to Interference-plus-Noise Ratio for a channel it is communicating over and determining a preferred channel list that contains a list of channels that have the best average Signal to Interference-plus-Noise Ratio; and,
    wherein when one of said one or more mobile nodes determines that the average Signal to Interference-plus-Noise Ratio of a new channel is better by a set amount than the average Signal to Interference-plus-Noise Ratio of said channel said mobile node is communicating with said mobile node hands off to said new channel if said uplink interference and channel capacity of said new channel allow handoff.

2. The threshold-less method for mobile node handset handoff between channels of multiple base stations of claim 1 wherein if the average Signal to Interference-plus-Noise Ratio of said channel said mobile node is communicating with is over a set level said mobile node does not handoff to said new channel.

3. The threshold-less method for mobile node handset handoff between channels of multiple base stations of claim 1 wherein Packet Error Rate and Received Signal Strength Indicator are also included in the information of said beacon and stored in said one or more mobile node such that if the average Signal to Interference-plus-Noise Ratio of said new channel and a second new channel are close in value said stored Packet Error Rate and Received Signal Strength Indicator can also be used to determine which channel said mobile node will select for handoff.

4. The threshold-less method for mobile node handset handoff between channels of multiple base stations of claim 1 wherein proactive scanning of said beacons is used by said one or more mobile nodes when said one or more mobile node are in an active communication with said multiple base stations transferring voice or data 5. The threshold-less method for mobile node handset handoff between channels of multiple base stations of claim 1 wherein once said new channel is selected for handoff a set period of time must pass with the average Signal to Interference-plus-Noise Ratio of said new channel, continuing to be better by a set amount than the average Signal to Interference-plus-Noise Ratio of said channel said mobile node is communicating with to allow handoff if said uplink interference and channel capacity of said new channel still allow handoff.

* * * * *